United States Patent [19]

Wataya et al.

[11] Patent Number: 4,594,987

[45] Date of Patent: Jun. 17, 1986

[54] FUEL INJECTION CONTROL APPARATUS FOR INTERNAL COMBUSTION ENGINE

[75] Inventors: Seiji Wataya, Himeji; Yoshiaki Kanno, Kakogawa; Yukinobu Nishimura, Himeji; Setsuhiro Shimomura, Himeji; Osamu Matsumoto, Himeji, all of Japan

[73] Assignee: Mitsubishi Denki Kabushiki Kaisha, Tokyo, Japan

[21] Appl. No.: 704,578

[22] Filed: Feb. 22, 1985

[30] Foreign Application Priority Data

Feb. 27, 1984 [JP] Japan .................................. 59-35542

[51] Int. Cl.$^4$ ........................ F02M 51/00; G01F 1/68

[52] U.S. Cl. ....................................... 123/494; 73/118; 73/204

[58] Field of Search ........................ 123/478, 494, 488; 73/116, 118, 204

[56] References Cited

U.S. PATENT DOCUMENTS

| | | | |
|---|---|---|---|
| 4,311,042 | 1/1982 | Hosoya et al. | 123/478 X |
| 4,404,846 | 9/1983 | Yamauchi et al. | 123/478 X |
| 4,527,530 | 7/1985 | Abe et al. | 73/118 |

FOREIGN PATENT DOCUMENTS

| | | | |
|---|---|---|---|
| 2436 | 1/1982 | Japan | 123/494 |
| 56-632 | 4/1982 | Japan | 123/494 |
| 73831 | 5/1982 | Japan | 123/494 |
| 73830 | 5/1982 | Japan | 123/494 |

*Primary Examiner*—Tony M. Argenbright

*Attorney, Agent, or Firm*—Leydig, Voit & Mayer, Ltd.

[57] ABSTRACT

A fuel injection control apparatus for an internal combustion engine using a hot-wire type air flow sensor wherein, even during a low engine speed and in a fully opened condition of the throttle valve of the engine, the output of the air flow sensor is corrected corresponding to the opening of the throttle valve and the engine speed on the basis on a predetermined relationship therebetween, thereby providing a proper A/F ratio.

5 Claims, 9 Drawing Figures

FUEL INJECTION CONTROL APPARATUS FOR INTERNAL COMBUSTION ENGINE

BACKGROUND OF THE INVENTION

This invention relates to a fuel injection control apparatus for an internal combustion engine, and in particular to a fuel control apparatus for processing the measured values of the inlet air flow rate of an internal combustion engine for an automobile.

Heretofore, there has been proposed such a fuel control apparatus for an internal combustion engine as shown in FIG. 1. In the figure, an internal combustion engine 1 is supplied with fuel by an electromagnetically driven injector 2. A hot-wire type air flow sensor (hereinafter abbreviated as AFS) 3 for sensing the flow rate of an inlet air inhaled into the engine 1 and a throttle valve 5 for adjusting the flow rate of the inlet air into the engine 1 are mounted on the inlet pipe 6 as shown in FIG. 1. A water (coolant) temperature sensor 7 is also disposed near the engine 1 to indicate the temperature of the engine 1. An ignition control unit 8 computes a fuel amount to be supplied to the engine 1 from an air flow rate signal obtained by the AFS 3 and applies to the injector 2 pulses whose pulse widths correspond to a required fuel amount. The ignition control unit 8 is connected to a well known ignition device 9 which generates an ignition pulse signal each time the engine 1 is at a predetermined rotational angle. Also disposed in this fuel control apparatus are a fuel tank 11, a fuel pump 12 for pressurizing the fuel, and a fuel regulator 13 for maintaining a constant pressure on the fuel supplied to the injector 2, as is well known in the art.

The ignition control unit 8 includes an input interface circuit 80, a micro-processor 81 for processing various input signals from the input interface circuit 80, computing a fuel amount to be supplied to the inlet pipe 6 of the engine 1 in accordance with a program previously stored in a ROM 82, and for controlling the driving signal of the injector 2, a RAM 83 for temporarily storing data during the process of the computation of the micro-processor 81, and an output interface circuit 84 for driving the injector 2.

In the operation of the fuel injection control apparatus for an engine shown in FIG. 1, in the well known manner, the control unit 8 receives as an input an inlet air flow rate of the engine 1 detected by the AFS 3, calculates a fuel amount to be supplied to the engine 1 on the basis of the detected flow rate, detects the rotational speed of the engine 1 from the ignition pulse frequency provided by the ignition device 9, calculates a fuel amount per one engine revolution, and applies pulses with a required pulse width to the injector 2 in synchronization with the ignition pulses. It is to be noted that since the air/fuel (hereinafter abbreviated as A/F) ratio required for the engine 1 needs to be preset at the rich side when the temperature of the engine 1 is low, the pulse width of the pulses applied to the injector 2 may be incrementally corrected in accordance with thermal signals obtained from the coolant temperature sensor 7.

Since the AFS 3 used for this fuel control apparatus can detect the inlet air flow rate by the weight thereof, it has an excellent feature that there is no need to additionally provide a correction means for changes in the atmospheric pressure. However, the AFS 3 is quite sensitive to an air blow-back phenomenon caused by the overlapped operation of the inlet and exhaust valves of the engine whereby the AFS 3 detects an inlet air flow rate signal including the blow-back flow rate so that it erroneously develops an output signal indicative of a flow rate larger than the actual inlet air flow rate.

The aforementioned blow-back phenomenon may easily arise during low speeds of the engine and in a condition where the throttle valve of the engine is fully opened, where the true inlet air flow rate assumes such a waveform as if the inlet air flow rate has increased as shown in FIG. 2, despite the fact that no inlet air is inhaled during a time interval Tr.

As a result, as shown in FIG. 3, the output of the AFS 3 exhibits a value considerably higher than the true value (shown by dotted lines) during a low speed zone (or region) and in the fully opened condition of the throttle valve. Dependent on the layout of the engine or the inlet air system, an error due to the blow-back phenomenon may attain as much as a 50% increase of the true value so that such an AFS can not be made practical without any modification thereof.

In order to compensate for such an error, there has been proposed a system in which the output signal "a" shown by the arcuate portion of a solid curve in FIG. 4 provided by the AFS 3 is neglected. Instead a clipping value "c" (average value), shown by a dotted line in FIG. 4, which is somewhat larger (by e.g. 10%) than a value "b" (actual value) of the true inlet air flow rate of the engine 1 is determined by reading from the ROM 82 the maximum inlet air flow rate (including some variation) corresponding to speed of the engine 1, which was previously stored in the ROM 82.

This operation based on the concept of FIG. 4 is illustrated in the flow chart shown in FIG. 5. Namely, at first, an inlet air flow rate (Qa) is read in by the AFS 3 and an engine speed (Ne) is read in by the ignition device 9 (step T1 and T2). It is then checked in step T3 whether or not $Qa > c(Ne)$, i.e. whether or not Qa is larger than the clipping value c(Ne) which is a function of the engine speed Ne. If the answer is "yes", then the clipping operation is made in step T4 so that the inlet air flow rate is clipped to c(Ne). If the answer is "no", then no clipping operation is made as illustrated in step T5 so that the inlet air flow rate Qa is directly used. Then, the pulse width of the pulse to be applied to the injector 2 is calculated in step T6 according to the well known equation: $To = KxQ/Ne$ where K is a predetermined constant.

However, according to this system, the clipping value "c" shown in FIG. 4 for the inlet air flow rate is preset at maximum inlet air flow rate for the engine 1 being at sea level, and therefore, an A/F ratio for a low atmospheric pressure when a car is being driven at a higher altitude should be largely shifted towards the rich side, resulting in a possibility of not only wasting fuel but also inducing a misfire.

On the other hand, another correction system of subtracting a blow-back waveform from the inlet air waveform has also been proposed. However, the blow-back waveform gradually varies relative to the opening of the throttle valve and the engine speed so that the discrimination between the blow-back waveform and the inlet air waveform can not be precisely made. One example of this system is disclosed in Japanese Patent Application Laid-open No. 56-108909 published Aug. 28, 1981. This publication describes an air flow rate detector in which a hot-wire type AFS is used to detect the inlet air flow rate by correcting an error due to the blow-back air flow rate.

In such a fuel injection control apparatus for an internal combustion engine thus arranged, a disadvantage is that the hot-wire type AFS used therein erroneously detects the inlet air flow rate to be higher than the true value due to the air blow-back phenomenon arising during low engine speed and in the fully opened condition of the throttle valve due to the overlapped operation of the valves of the engine so that an operating zone exists where the A/F ratio can not be properly controlled.

SUMMARY OF THE INVENTION

It is accordingly an object of the invention to provide a fuel injection control apparatus for an internal combustion engine wherein even of low speed and fully opened operating conditions, the output of a hot-wire type AFS is corrected corresponding to the opening of the throttle valve and the engine speed, thereby providing a proper A/F ratio.

In order to accomplish this object, the present invention broadly provides a fuel injection control apparatus for an internal combustion engine comprising a hot-wire type air flow sensor means for detecting the inlet air flow rate of the engine, a speed sensor means for detecting the rotational speed of the engine, a control means for computing a fuel amount to be supplied to the engine on the basis of outputs of the air flow sensor means and said speed sensor means, and a fuel injection valve driven by the control means; the apparatus further comprising a throttle valve sensor means for detecting the opening of the throttle valve of the engine, and the control means including a correction means for correcting the output of the air flow sensor means according to the outputs of the throttle valve sensor means and the speed sensor means.

The correction means preferably includes a storage means having stored therein a data map comprising a relationship between an opening of the throttle valve of an engine, the rotational speed of an engine, and a correction factor for correcting the inlet air flow rate of the engine. The correction factor in the data map of the storage means may be such that the detected inlet air flow rate is corrected to be equal to or somewhat larger than the true inlet air flow rate. The correction means preferably further includes means for multiplying the correction factor with the output of the air flow sensor means. The correction means preferably further includes means for averaging the output of the air flow sensor means.

The speed sensor means preferably comprises an ignition device and a speed detector connected to the ignition device to derive a speed signal from the ignition signal of the ignition device.

BRIEF DESCRIPTION OF THE DRAWINGS

Throughout the figures, the same reference numerals designate identical or corresponding portions.

DETAILED DESCRIPTION OF THE PREFERRED EMBODIMENT

Figure 5:
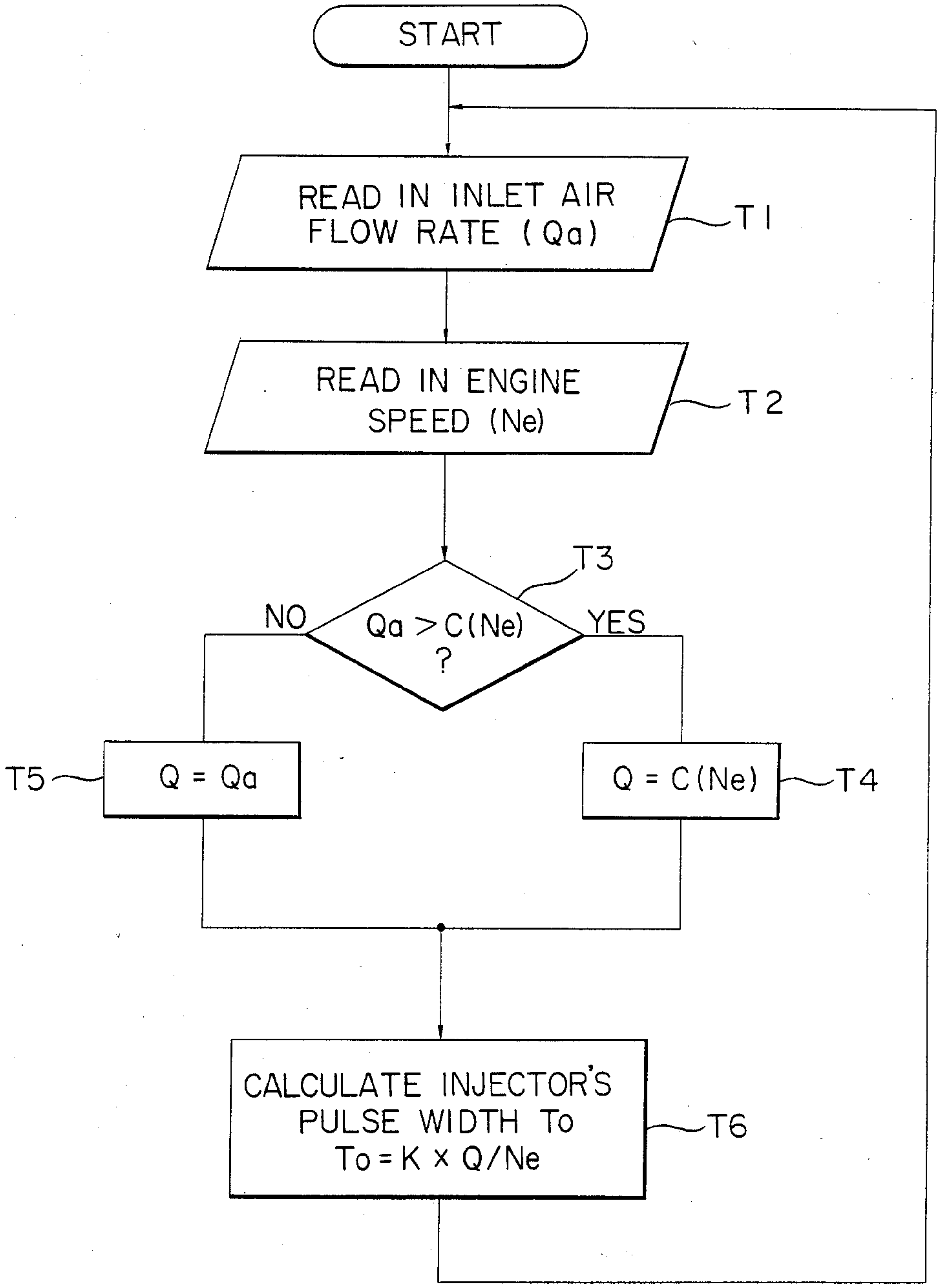
FIG. 5 shows a conventional flow chart executed in the arrangement of FIG. 1.

One preferred embodiment of a fuel injection control apparatus for an internal combustion engine will now be described in detail with reference to FIGS. 5–8. The difference between the arrangements of FIGS. 1 and 5 is that in the latter, an additional sensor 15, which may be formed of a variable resistor, for sensing the opening of the throttle valve 5 is provided and the output signal of the sensor 15 is sent to the control unit 8.

Figure 1:
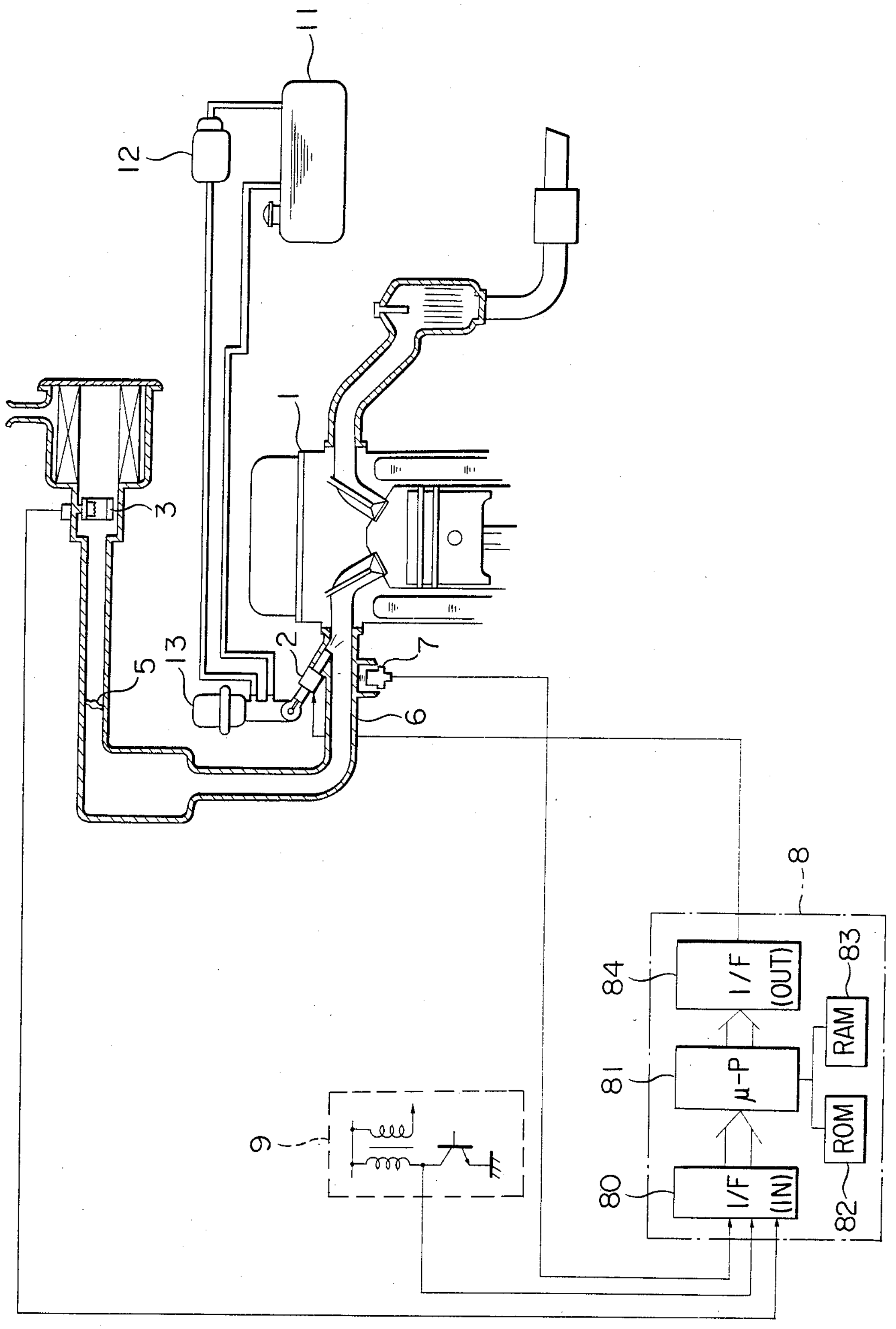
FIG. 1 shows an arrangement diagram of a general fuel injection control apparatus for an internal combustion engine.
Figure 2:
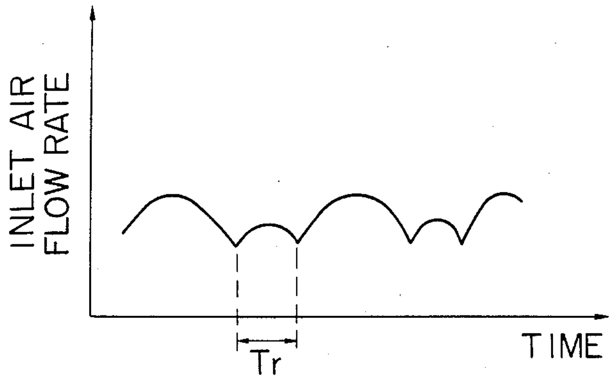
FIG. 2 shows a waveform diagram of the output of a hot-wire type air flow sensor shown in FIG. 1 as a function of time.
Figure 3:
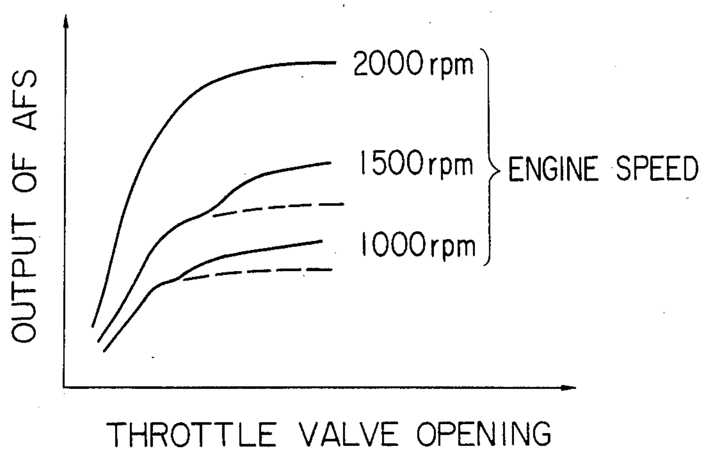
FIG. 3 shows characteristic curves of the output of the air flow sensor as a function of the opening of the throttle valve of the engine with an engine speed being a parameter.
Figure 6:
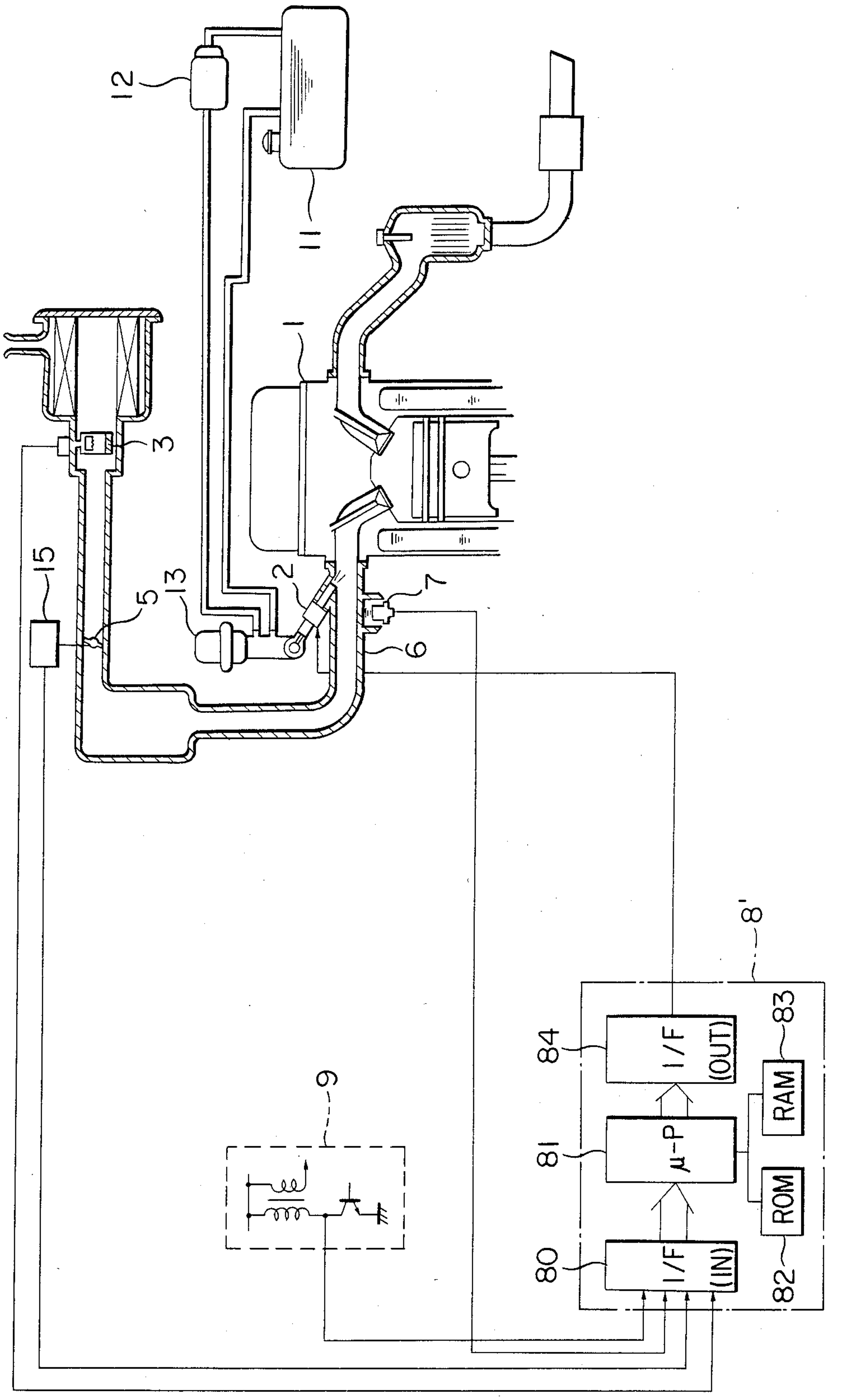
FIG. 6 shows an arrangement diagram of one preferred embodiment of a fuel injection control apparatus for an internal combustion engine according to this invention.

The arrangement of FIG. 6 also includes a control unit 8' with the same arrangement as that in FIG. 1 except for the input from the sensor 15. The control unit 8' is functionally schematically illustrated in FIG. 7 in the form of a block diagram while the program flow chart of the control unit 8' is illustrated in FIG. 8. Therefore, the operation of the control unit 8' will be described along FIG. 7, while referring to FIG. 8. It is to be noted that the correcting operation is performed for all the operating zone regardless of the blow-back zone.

Figure 4:
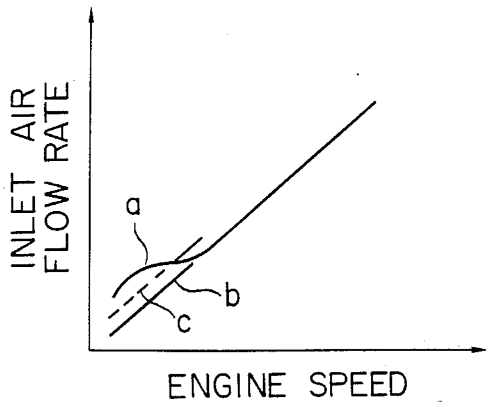
FIG. 4 shows an inlet air flow rate characteristic as a function of an engine speed.
Figure 7:
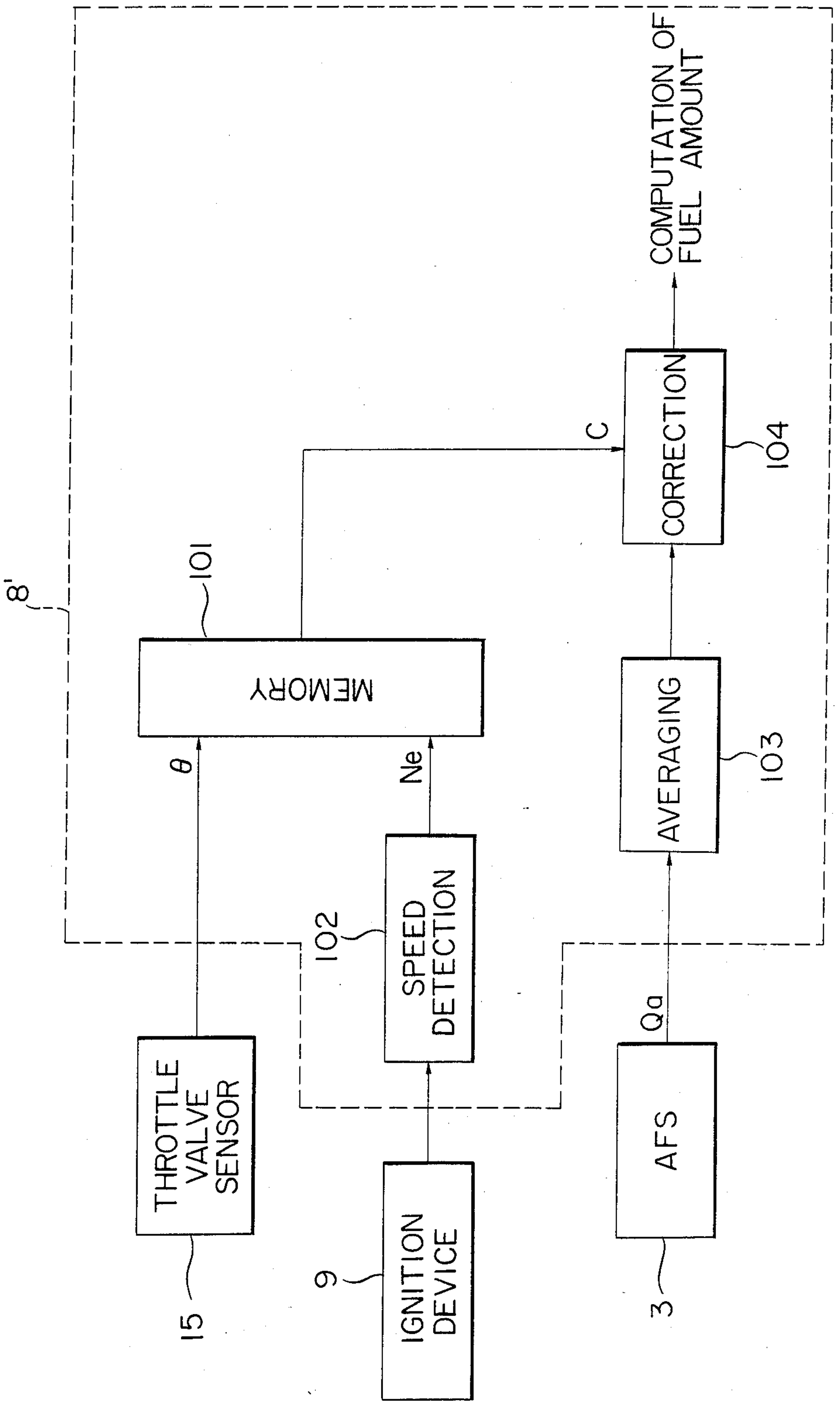
FIG. 7 schematically shows a functional block diagram of a control unit 8' used in the arrangement of FIG. 6.
Figure 8:
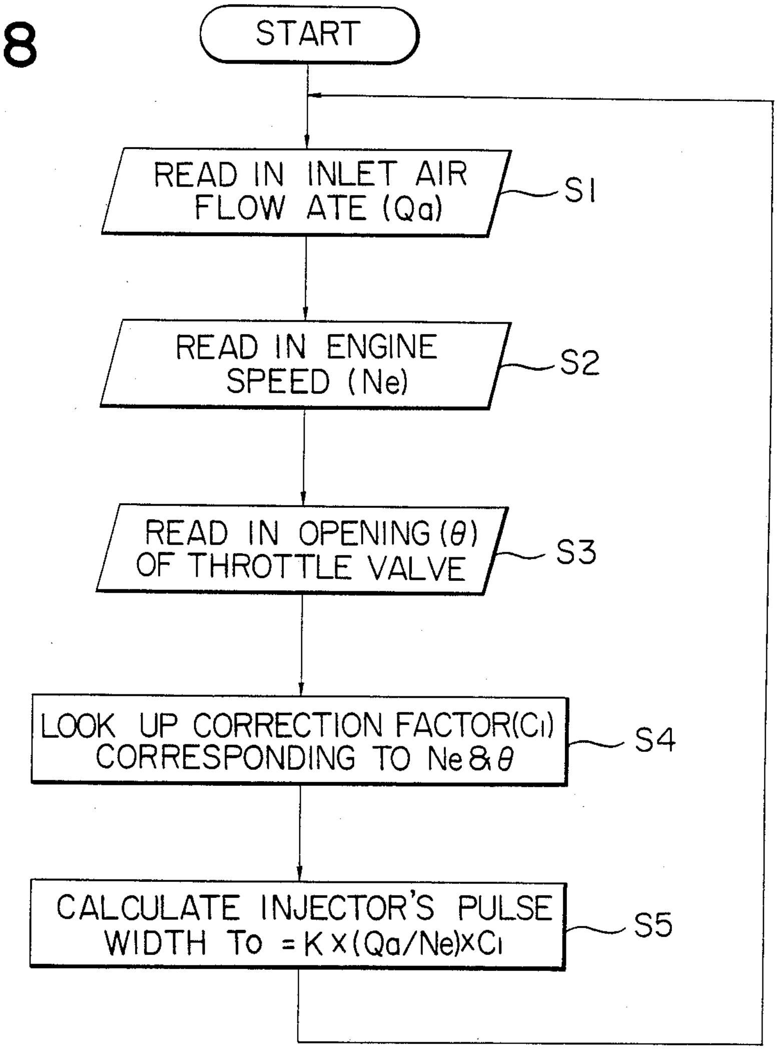
FIG. 8 shows a flow chart executed by a control unit shown in FIG. 6.
Figure 9:
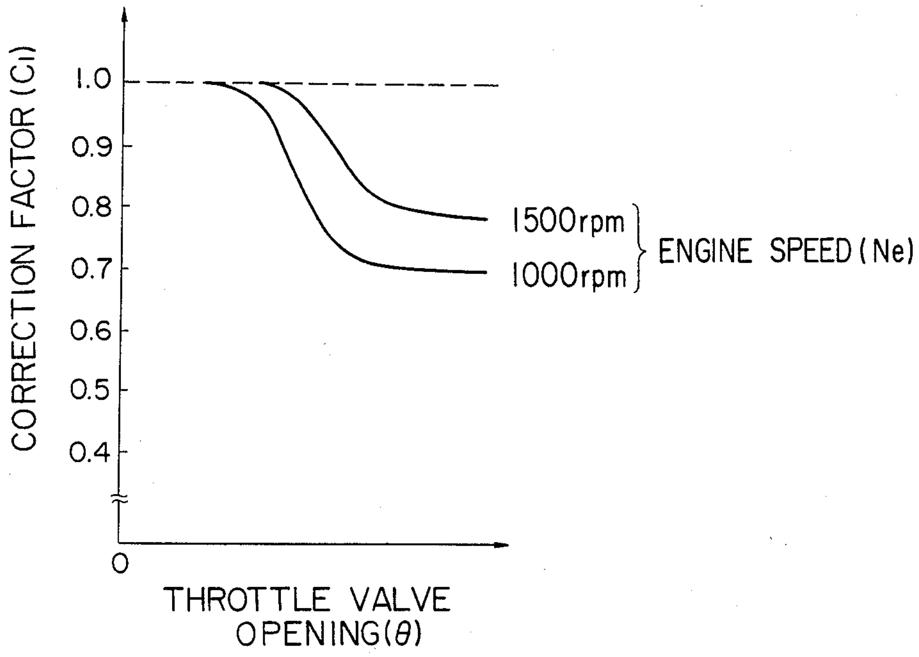
FIG. 9 shows correction factors cl as a function of throttle valve openings θ corresponding to engine speeds Ne which are stored as a map in a memory 101 of the control unit in FIG. 6.

Referring to the FIGS. 7 and 8, a memory block 101 has previously stored therein a map for determining a correction factor (cl) corresponding to the engine speed (Ne) detected by the ignition device 9 through a speed detecting block 102 and to the opening (θ) of the throttle valve 5 detected by the sensor 15, in accordance to the waveforms shown in FIG. 9. Therefore, when the control unit 8' reads in the inlet air flow rate (Qa) provided as an output from the AFS 3, the engine speed (Ne) provided as an output from the ignition device 9 through the speed detecting block 102, and the opening (θ) of the throttle valve 5 provided as an output from the sensor 15 (steps S1,S2,S3 in FIG. 8), the memory block 101 looks up a correction factor cl corresponding to the opening (θ) of the throttle valve and the engine speed (Ne) (step S4 in FIG. 8). The output of an averaging block 103 for averaging the output of the AFS 3 indicative of the inlet air flow rate (Qa) of the engine 1 is corrected, i.e., multiplied in a correction block 104 by a correction factor cl obtained in the memory block 101. Then, the pulse width To of the pulses applied to the injector 2 is calculated as To=Kx(Qa/Ne)xcl (step S5 in FIG. 8), in the same manner as the case of FIG. 5. As a result, some error of the AFS 3 in the blow-back zone can be corrected. It is to be noted that in the operating zone except the blow-back zone, no particular correction is made as seen from the straight portion of the solid line in FIG. 4.

As described above, according to this invention, a fuel supply control by means of a hot-wire type air flow sensor can be precisely made in the entire operating range of the engine including a zone where the engine speed is low and the throttle valve is fully opened so as to reduce, in the blow-back zone, the output level of the air flow sensor corresponding to a predetermined relationship of the engine speed, the opening of the throttle valve, and a correction factor for the inlet air flow rate of the engine. Therefore, in any operating condition, a proper A/F ratio is obtained. Furthermore, even when the engine is operated at high altitudes where a low atmospheric pressure exists, the detected air flow rate is reduced by a ratio in the same situation as the case at sea level so that no large shift of A/F ratio towards the rich side arises, resulting in an excellent fuel injection control apparatus for an internal combustion engine.

It is to be noted that while this invention has been described with reference to the described and illustrated embodiment, it should not be limited thereto and various modifications thereof may be made without departing from the spirit of this invention.

What we claim is:

1. A fuel injection control apparatus for an internal combustion engine comprising a hot-wire type air flow sensor means for detecting the inlet air flow rate of said engine, a speed sensor means for detecting the rotational speed of said engine, a control means for computing a fuel amount to be supplied to said engine on the basis of the outputs of said air flow sensor means and of said speed sensor means, and a fuel injection valve driven by said control means;

said apparatus further comprising a throttle valve sensor means for detecting the opening of the throttle valve of said engine, and said control means including a correction means having means for storing therein a data map comprising correction factors as a function of an opening of the throttle valve and the rotational speed of said engine, and means for reading correction factors from said memory means and applying said correction factors for correcting the output of said air flow sensor means according to the openings of the throttle valve detected by said throttle valve sensor means and the speed of the engine detected by said speed sensor means.

2. A fuel injection control apparatus according to claim 1 wherein said correction factors in said data map of said storage means correct the detected inlet air flow rates to be equal to or somewhat larger than the true inlet air flow rates.

3. A fuel injection control apparatus according to claim 1 wherein said correction means further includes means for multiplying said correction factors with outputs of said air flow sensor to calculate the true air flow rates.

4. A fuel injection control apparatus according to claim 2 wherein said correction means further includes means for averaging the values representing the outputs of said air flow sensor means.

5. A fuel injection control apparatus according to claim 3 wherein said speed sensor means comprises an ignition device and a speed detector connected to said ignition device to derive a speed signal from an ignition signal of said ignition device.

* * * * *